Aug. 9, 1966    H. J. HAGAN    3,264,808
COMBINE HEADER CONTROL

Filed March 6, 1964    2 Sheets-Sheet 1

Hugh J. Hagan
INVENTOR.

BY *Clarence A. O'Brien*
*and Harvey B. Jacobson*
Attorneys

Aug. 9, 1966 H. J. HAGAN 3,264,808
COMBINE HEADER CONTROL
Filed March 6, 1964 2 Sheets-Sheet 2

Hugh J. Hagan
INVENTOR.

BY *Alvance A. O'Brien*
*and Harvey B. Jacobson*
Attorneys

United States Patent Office 3,264,808
Patented August 9, 1966

3,264,808
COMBINE HEADER CONTROL
Hugh J. Hagan, Woodson, Ill.
Filed Mar. 6, 1964, Ser. No. 349,958
4 Claims. (Cl. 56—214)

This invention comprises a novel and useful combine header control and more particularly pertains to a device connected to a combine header and which will compensate at least partially for the weight of the header to facilitate its vertical movement in a floating action over irregular contours of the ground.

In conventional combines and of the equipment having vertically movable headers such as those containing cutting bars and the like, it is customary to provide a power lift means for vertically adjusting the header with respect to the ground in order to properly position the header for the most effective operation upon crops and the like.

Further, it is customary to provide guide means and gauge means such as shoes carried by the header and which slide over the surface of the ground to thereby maintain the header at a constant height above the ground despite irregularities in the terrain over which the device passes.

It is the primary purpose of this invention to improve upon the construction and operation of headers of this character by at least partially compensating for the weight of the header so that the ground engaging shoe or other gauge or guide means may more readily effect the necessary vertical movement of the header in accordance with the terrain, and which device shall not in any manner interfere with the normal operation of the power operated vertically adjusting lift means for the header.

A still further purpose of the invention is to provide a header control which may be either applied to conventional power operated header adjusting mechanisms as an attachment for accessories thereto or may be initially assembled therewith as an original installation.

Still another purpose of the invention is to provide a header control wherein an auxiliary compensating lift spring assembly may be applied to a header in side-by-side relation with the power operated header lift mechanism and may be adjusted to substantially compensate for the weight of the header thereby rendering the vertical adjustment of the header by the power lift means much easier and also enabling the header to be vertically adjusted by the usual gauge means or shoe in accordance with the terrain.

A still further purpose of the invention is to provide an auxiliary spring assembly in accordance with the foregoing objects which may be mounted upon the combine and the header by the same mounting means or an extension of the original mounting means by which the power operated header lift means is mounted.

Still another purpose of the invention is to provide a device in accordance with the preceding objects whereby with a slight change the original power operated lift means of the header may be provided with a lost motion assembly such that when the gauge means or shoe of the header vertically moves the header in accordance with varying terrain, there will be no load imposed upon or change in the adjustment of the power lift means and the header will be returned to its original position and association of the power lift means after the temporary vertical adjustment of the header has been completed.

A very important feature, purpose and advantage of this invention resides in the provision of a header control which by its facilitating the upward movement of the header independently of the power operated header elevating mechanism will enable the header to avoid fallen leaves, vegetation or trash which may lie upon the ground. Such material, under certain conditions, such as frost, wet weather and the like may cause considerable trouble for the cutter bar of the conventional header control. The ease of movement or floating action of the counterbalanced header of this invention avoids this difficulty.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 4:
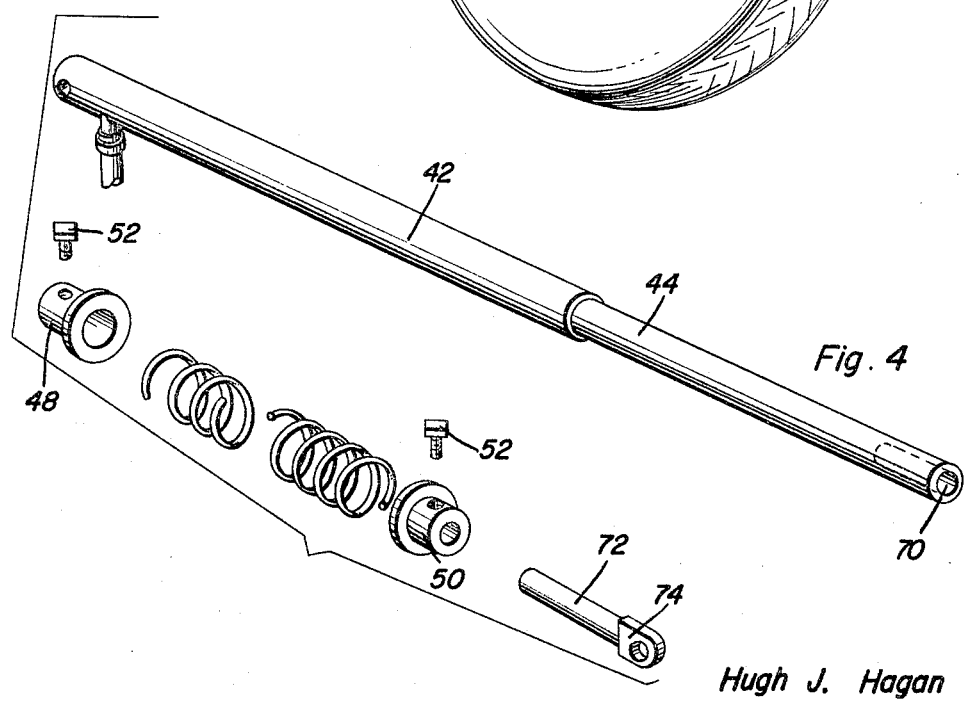
Figure 2:
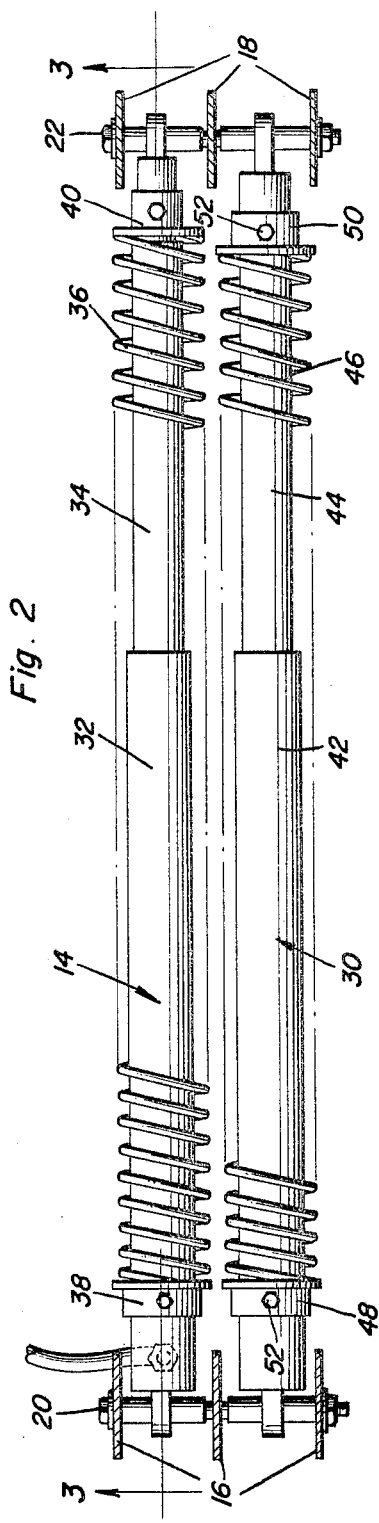
FIGURE 2 is a view taken upon a somewhat enlarged scale and horizontal section substantially upon the plane indicated by section line 2—2 of FIGURE 1 and showing both the power operated lift means and the auxiliary lift means of this invention in cooperative relationship with each other.
Figure 3:
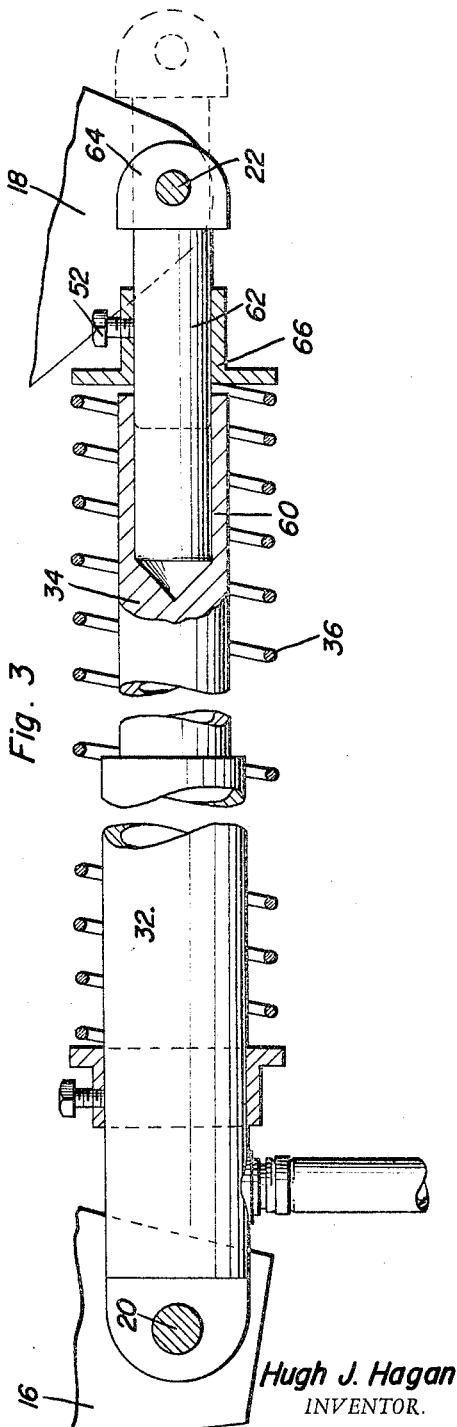

FIGURE 3 is a view upon a still further enlarged scale taken in vertical longitudinal section substantially upon the plane indicated by section line 3—3 of FIGURE 2, parts being broken away, and showing a slight alteration in a portion of a conventional fluid pressure operated header lift means in order to provide a lost motion connection therefor in accordance with this invention; and FIGURE 4 is an exploded perspective view of the components of this invention.

It has been heretofore known to provide a combine header with a gauging or sensing means which in response to irregularities of the terrain over which the device passes will actuate mechanism to effect a lifting of the header to clear such obstructions and thereafter will permit the header to return to its original adjusted vertical position. The example of such prior construction may be found in the prior patents to Sallee, No. 3,088,264; Kesselring, No. 2,589,553 and Wright, No. 2,750,727. However, in such prior compensating devices for the control of headers it was necessary for the power operated lifting mechanism to be subjected to and handle the entire weight of the header during the temporary and often frequent vertical movements of the header necessitated by irregular terrain. This imposed a considerable and undue wear upon the power operating means and the associated control mechanism responsive to the varying terrain over which the header passed.

The present invention overcomes the problem of the necessary temporary vertical repositioning of the header in response to irregular terrain over which the device passes by providing a means to compensate for the weight of the header so that relatively small forces are required to effect the necessary elevation of the header from time to time, and further provides a means effecting a lost motion between the power operating lift means of the header so that its relation to the header is unaffected during the operation of the temporary adjustments of the header with respect to the terrain.

Figure 1:
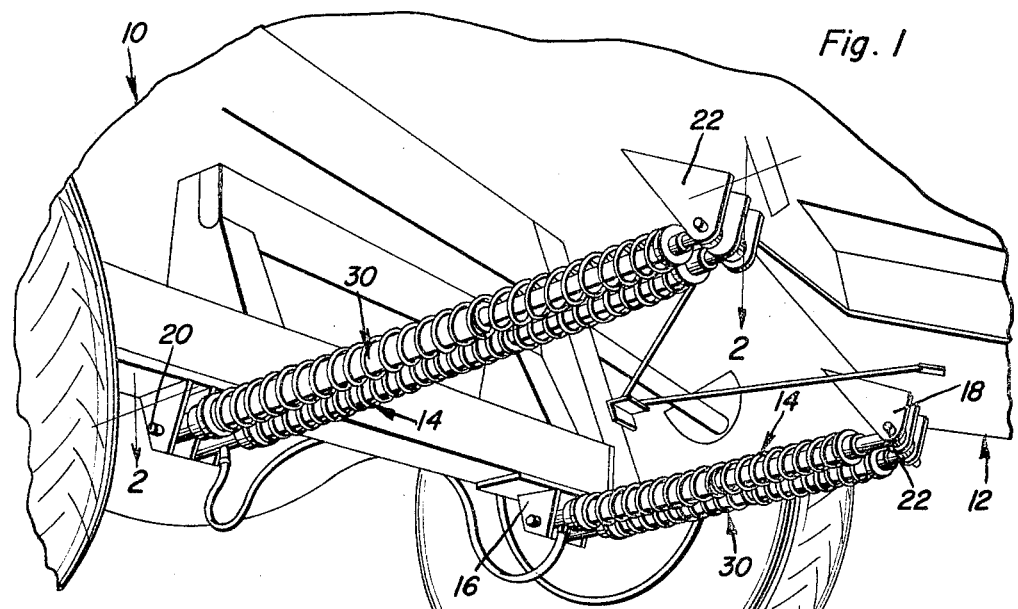
FIGURE 1 is a fragmentary perspective view of a portion of a combine and header and showing the conventional power operated header lift means together with the auxiliary lift mechanism of this invention being applied thereto.

Referring now specifically to FIGURE 1, it will be observed that the numeral 10 designates generally a portion of a conventional combine or other apparatus having a vertically swingable header of any conventional design, a portion of which is indicated by the numeral 12. Inasmuch as the header and combine construction may be of any conventional design, and is well understood by those skilled in the art, it being only necessary that the header be mounted for controlled vertical movement for the purpose of this invention, a further description thereof is deemed to be unnecessary.

In the usual combine and header assembly there is provided a pair of fluid pressure power operated cylinder and piston lift units each indicated generally by the numeral 14. Each unit is conventionally connected by pivot connections to the combine and to the header. Thus, mounting means or anchor means in the form of brackets 16 are secured to the combine and corresponding mounting brackets 18 are secured to the header with the opposite ends of the fluid pressure operated cylinder and piston lift units 14 being pivotally connected as by pivot pins 20 to the anchor bracket 16 on the combine and at 22 to the mounting brackets on the header. As will be appreciated, by control operation of the lift means 14, the header may be raised or lowered to a selected vertical position with respect to the ground.

In accordance with this invention, an auxiliary or compensating spring assembly indicated generally by the numeral 30 is provided. The auxiliary lift unit 30 is likewise preferably of the cylinder and piston construction so that it is longitudinally extensible and substantially the same length as that of the power operated lift unit 14. At its opposite ends, each of the auxiliary units 30 is mounted upon the combine and the header by pivotal connections and preferably by the same pivotal connections 20 and 22 with which the apparatus is equipped.

Alternatively, extensions of these pivotal connections and even the provision of additional mounting brackets may be provided to effect this mounting in a side-by-side relation.

As indicated in FIGURE 2, the conventional power operated lift unit 14 has its cylinder 32 and piston 34 surrounded by a coil compression spring 36 whose extremities are adjustably retained between the collars 38 and 40 which by means of setscrews are adjustably secured upon the cylinder and piston components. In any similar manner, the auxiliary lift unit 30 likewise includes a telescoping cylinder 42 and piston 44 surrounded by coil compression spring 46 retained between adjustable collars as at 48 and 50. The collars 48 and 50 are slidably adjusted upon the cylinder and piston components 42 and 44 and are retained by setscrews 52 to provide an adjusted spring tension such that it will completely or at least partially, as may be desired, counterbalance and compensate for the weight of the header so that a very little force is required to effect lifting or lowering of the latter. In this manner, the usual header or gauge means is enabled to lift the header to clear an obstacle on the ground with very little effort.

Referring now to FIGURE 3 it will be observed that the invention further provides a lost motion connection for the original and conventional fluid pressure operated power lift unit 14. For that purpose, the cylinder component 34 is either replaced or is bored out at one end so that there is provided therein an open chamber 60 into which is slidably fitted an extension piston 62 having an apertured head 64 in which is disposed the pivot pin 22. The previous adjusting collar 40 is either replaced by a new adjusting collar 66 having the setscrew 52 or is mounted upon the extension plunger 62. When so mounted, it serves to compress the spring 36 of the original construction.

As a result of this arrangement, and the lost motion connection thereby provided for the power operated lift unit, it is evident that when the header is lifted as by its gauge or foot member encountering rising terrains, owing to the compensating atcion of the auxiliary spring assembly, the header will readily lift and during this lifting movement the extension plunger 62 will slide outwardly in the bore 60 without disturbing the setting of the piston component 34 in the cylinder component 32 of the power operated lift means. After the header has passed the obstruction, it may drop its original position with the plunger 62 moving inwardly and stopping when it has reached the bottom of its recess or bore 60 so that the power or operated lift unit is again in position to effect any desired vertical adjustment of the position of the header.

As shown in FIGURE 4, the auxiliary lift unit includes the telescoping cylinder and piston components 42 and 44, with the latter having a socket 70 therein corresponding to the recess, bore or socket 60 and with an extension plunger 72 having an apertured lug 74 thereon for the reception of the pivot pin 22 or extension thereof. Similarly, the adjustable collar 50 with a setscrew 52, the further adjustable collar 48 at the other end of the unit are provided so as to enable adjustment of the spring load of the spring 46.

In some instances, the bore 70 and the extension plunger 72 may be omitted and the end of the piston 44 may itself be provided with an apertured lug for attachment to the pivot pin 22 at the combine header.

It will thus be apparent there has been provided an auxiliary lift means which would effectively compensate for and counterbalance the weight of the header thereby facilitating and lessening the force required for its vertical movement even by the power lift means or by a ground responsive adjusting means. Further, lifting of the header in response to irregularities of the terrain may be effected without interfering with the normal adjustment and setting of the power operated lift means.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A header control for a combine header of the type having a header mounted on a combine for vertical swinging movement and with a fluid pressure operated cylinder and piston lift unit for adjusting vertically the position of said header together with pivot connections at the opposite ends of said lift unit securing the latter to said combine and to said header; said header control comprising an auxiliary lift spring assembly, means connecting said assembly to said combine and to said header, said auxiliary lift spring assembly being adjustable and exerting an adjustable upward resilient force upon said header at least partially compensating for the weight of the header, said auxiliary lift spring assembly being disposed in parallel relation to said lift unit and mounted upon coaxial pivots.

2. A header control for a combine header of the type having a header mounted on a combine for vertical swinging movement and with a fluid pressure operated cylinder and piston lift unit for adjusting vertically the position of said header together with pivot connections at the opposite ends of said lift unit securing the latter to said combine and to said header; said header control comprising an auxiliary lift spring assembly, means connecting said assembly to said combine and to said header, said auxiliary lift spring assembly being adjustable and exerting an adjustable upward resilient force upon said header at least partially compensating for the weight of the header, said auxiliary lift spring assembly parallel to said lift unit and mounted upon said combine and header by the same pivotal connections.

3. The combination of claim 2 wherein said lift unit has a bore in the outermost end of its piston component, an extension plunger being slidable in said bore and being secured to said header by said pivotal connection therewith, a collar on said plunger, a compression spring encircling said lift unit cylinder and piston components and abutting said extension plunger collar thereby providing a lost motion connection between said lift unit and said header.

4. The combination of claim 2 including a lost motion device interposed between said lift unit and said header and allowing movement of the latter away from said lift unit.

References Cited by the Examiner

UNITED STATES PATENTS

| | | | |
|---|---|---|---|
| 2,498,093 | 2/1950 | Paradise et al. | 56—18 |
| 2,513,111 | 6/1950 | Schiller | 56—23 |
| 2,544,023 | 3/1951 | Johnson | 171—24 |

FOREIGN PATENTS

| | | |
|---|---|---|
| 1,319,825 | 4/1962 | France. |
| 864,861 | 4/1961 | Great Britain. |

ANTONIO F. GUIDA, *Acting Primary Examiner.*

JOE O. BOLT, JR., *Examiner.*

RUSSELL R. KINSEY, *Assistant Examiner.*